Figure 1:
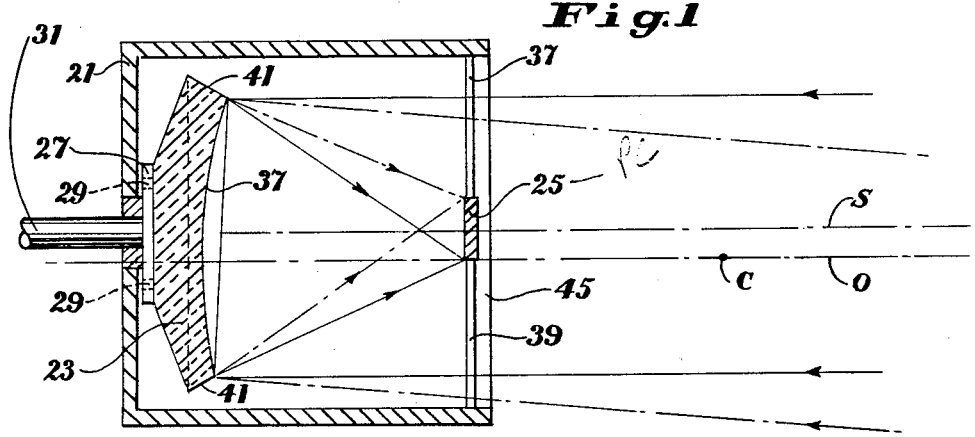

Aug. 22, 1961 — C. F. GRAMM — 2,997,598
OPTICAL SCANNING SYSTEM
Filed Dec. 6, 1954

Charles F. Gramm
INVENTOR.

2,997,598
OPTICAL SCANNING SYSTEM
Charles F. Gramm, Rochester, N.Y., assignor, by mesne assignments, to the United States of America as represented by the Secretary of the Navy
Filed Dec. 6, 1954, Ser. No. 473,491
2 Claims. (Cl. 250—236)

This invention relates to an optical scanning system for use in guided missiles or other target tracking apparatus.

Known scanning systems according to the prior art utilize a spherical first surface mirror having its optical axis displaced from the axis of rotation of the mirror by an amount equal to the radius of the circle of scan desired. The limiting aperture was placed in the plane of the photoelectric detector element or bolometer to flatten the field and fix the F. number. Rotating the mirror modulated the detector element with the image or images which were present in the focal plane and within the angular field of the detector element. However, when this system was aimed at a uniform but lower temperature background than the system of −15 to −20° centigrade temperature difference, an undesirable sine wave signal of large amplitude and at the scanning frequency was developed.

An object of the present invention, therefore, is to provide an optical scanning system in which this undesirable sine wave signal is substantially eliminated when the system is aimed at such uniform but lower temperature background than the system.

Figure 2:
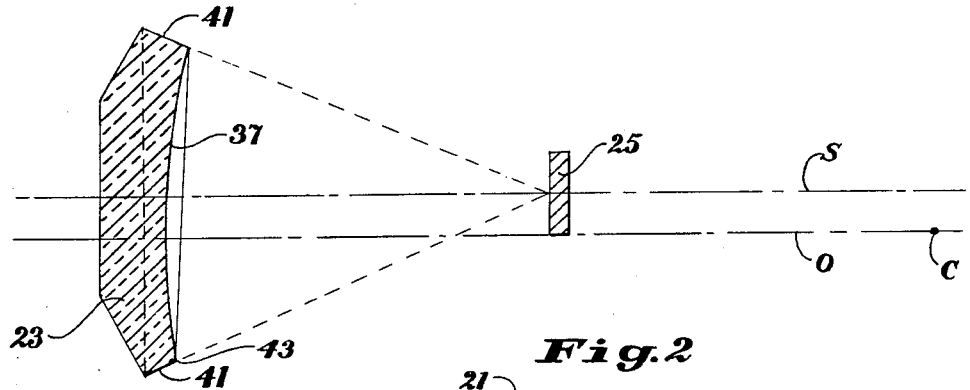
Figure 3:
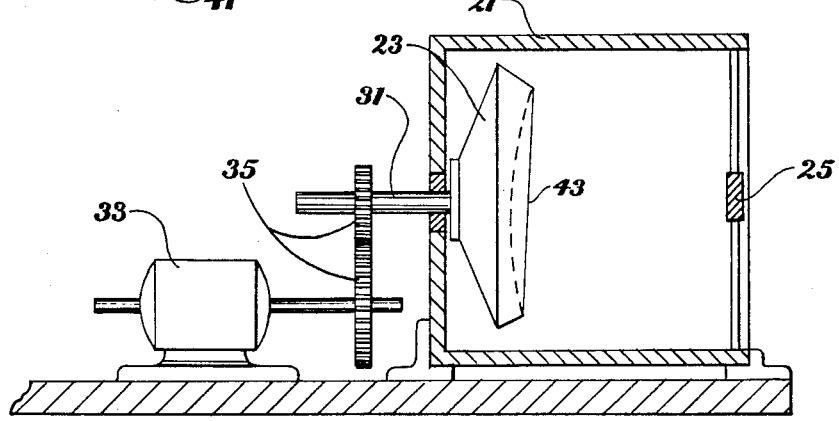

A further object of the present invention is to provide an optical scanning system in which the mirror edges are formed at such an angle with respect to the axis of rotation of the mirror as to produce substantially no modulation from the sides of the housing as seen by the detector element and which is the limiting aperture of the system. Other objects and advantages will become apparent to those skilled in the art from the description which follows with reference to the drawing in which like characters denote like parts and wherein:

FIG. 1 is a partially schematic cross sectional view of an optical scanning system according to the present invention; and FIG. 2 is an enlarged detail view of the mirror and detector means of FIG. 1 and illustrating the spaced relationship between the parts and FIG. 3 is another partially schematic cross sectional view further illustrating my invention shown in FIGS. 1 and 2.

In FIG. 1 cylindrical housing 21, illustrated in cross section, partially encloses the mirror 23 and photoelectric detector element 25 or other suitable radiation detector element such as a bolometer. Mirror 23, which is the limiting aperture of the system, is mounted on mounting flange 27 by mounting screws 29. Flange 27 is rigidly attached to shaft 31 whereby mirror 23, flange 27 and shaft 31 can be rotated as a unit about the spin axis S by a motor 33 or other suitable driving means through gearing 35 as shown in FIG. 3. Mirror 23 is provided with a spherical reflecting surface 37 having its center of curvature C located on its optical axis O which is displaced from but parallel to spin axis S. The distance between optical axis O and spin axis S is equal to the radius of the circle of scan desired, which is made equal to the radius of the detector element 25. The detector element 25 which is supported in housing 21 by any suitable means such as very thin rods 39 is symmetrically positioned with respect to spin axis S and is located in the focal plane of mirror 23. The edge surface 41 of mirror 23 is formed at an angle such that the vertex of the cone which is symmetric to spin axis S and determined by surface 41, is at the point of intersection of spin axis S and detector element 25 as illustrated in FIG. 2.

Under these circumstances it is obvious that if detector element 25 had only a minute area corresponding to a point on the spin axis S, absolutely no mirror-modulated radiation from the housing 21 could be seen by the detector element 25. Since detector element 25 has a finite size, however, some radiations from housing 21 are modulated by the mirror edge 43, as determined by the intersection of edge surface 41 and reflecting surface 37, and are seen by portions of detector element 25 not on spin axis S. The radiations so modulated by mirror 23 are small because during a complete revolution of mirror 23 the deviations in angular position of edge 43 as seen by portions of detector element 25 not on spin axis S are very small. Thus mirror 23 including edge 43 produces substantially no modulation from the internal wall of the housing as seen by the stationary detector element 25, and thus substantially eliminates the large undesirable scanning frquency sine wave signal present in the known prior art devices when aimed at a uniform but lower temperature background than the system.

The housing aperture 45 is of a diameter sufficiently large to be considered as a non-limiting aperture for the system so as to not vignette the off axis limiting rays.

It will be readily appreciated by those skilled in the art that the invention need not be limited to the use of a spherical mirror and that any concave infrared reflecting surface can also be advantageously utilized. Since many modifications or variations of construction shown are possible, the scope of the invention is not to be limited to the illustrated embodiment but is defined by the appended claims.

Having now particularly described my invention what I desire to secure by Letters Patent of the United States and what I claim is:

1. An optical scanning system comprising a cylindrical housing having an aperture in one end thereof, a spherical mirror mounted in said housing at the end thereof opposite said aperture, said mirror having an optical axis and mounted for rotation about a rotational axis spaced from and parallel to said optical axis and centered with respect to said aperture, means for rotating said mirror about said rotational axis, and photoelectric detector means symmetrically located with respect to said rotational axis and positioned in the focal plane of said mirror, said detector means having a radius equal to the distance between said rotational axis and said optical axis, and said mirror forming the limiting aperture of said system.

2. An optical scanning system comprising a cylindrical housing having an aperture in one end thereof, a spherical mirror mounted in said housing at the end thereof opposite said aperture and provided with a peripheral edge surface, said mirror having an optical axis and mounted for rotation about a rotational axis spaced from and parallel to said optical axis and centered with respect to said aperture, means for rotating said mirror about said rotational axis, and photoelectric detector means symmetrically located with respect to said rotational axis and positioned in the focal plane of said mirror, said detector means having a radius equal to the distance between said rotational axis and said optical axis, and said edge surface of said mirror coinciding with a part of the surface of a cone having a vertex at the point of intersection of said rotational axis and said detector means, said mirror forming the limiting aperture of said system.

No references cited.